(12) United States Patent
Xu

(10) Patent No.: US 7,769,044 B2
(45) Date of Patent: Aug. 3, 2010

(54) VOICE OVER INTERNET PROTOCOL FAVORING AGGREGATING TECHNOLOGY IN A WLAN

(75) Inventor: Xiaode Xu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 584 days.

(21) Appl. No.: 11/393,152

(22) Filed: Mar. 29, 2006

(65) Prior Publication Data

US 2007/0237120 A1 Oct. 11, 2007

(51) Int. Cl.
- *G01R 31/08* (2006.01)
- *H04L 12/28* (2006.01)
- *H04J 3/26* (2006.01)
- *H04J 3/16* (2006.01)
- *H04J 3/24* (2006.01)

(52) U.S. Cl. ............... 370/473; 370/252; 370/390; 370/432; 370/469

(58) Field of Classification Search ........... 370/432, 370/252, 389–393, 466–476
See application file for complete search history.

(56) References Cited

U.S. PATENT DOCUMENTS

| | | | |
|---|---|---|---|
| 7,224,704 B2 * | 5/2007 | Lu et al. | 370/476 |
| 2005/0226222 A1 | 10/2005 | Qian | 370/352 |
| 2006/0092871 A1 * | 5/2006 | Nishibayashi et al. | 370/328 |
| 2006/0291461 A1 * | 12/2006 | Stephens | 370/389 |
| 2007/0053354 A1 * | 3/2007 | Rudolf et al. | 370/389 |
| 2007/0104162 A1 * | 5/2007 | Kneckt et al. | 370/338 |
| 2008/0031200 A1 * | 2/2008 | Tang | 370/338 |

OTHER PUBLICATIONS

Mujtaba, Syed, TGn Sync Proposal Technical Specification, IEEE P802.11 Wireless LANs, Dated May 18, 2005, downloaded Jun. 4, 2008.*

* cited by examiner

*Primary Examiner*—Daniel J Ryman
*Assistant Examiner*—Thinh D Tran
(74) *Attorney, Agent, or Firm*—Brinks Hofer Gilson & Lione

(57) ABSTRACT

A system for aggregating packet in a Medium Access control layer of a router to improve effective bandwidth of transmission over a network. The system begins by receiving Medium Access Control Service Data Unit packets in a Medium Access Control unit of a router wherein each of the Medium Access Control Service Data Unit packets are addressed to different receivers. The Medium Access Control Service Data Unit packets are then aggregated into one Medium Access Control Protocol Data Unit packet. The Medium Access Control Protocol Data Unit packet is then transmitted to said Physical layer of said router for transmission.

30 Claims, 4 Drawing Sheets

VOICE OVER INTERNET PROTOCOL FAVORING AGGREGATING TECHNOLOGY IN A WLAN

FIELD OF THE INVENTION

This invention relates to the transmission of packets from an Access Point (AP). More particularly, this invention relates to aggregating packets in the Medium Access Control (MAC) layer of an AP. Still more particularly, this invention relates to a method of aggregating packets addressed to different destinations to increase the effective bandwidth of transmissions in a Basic Service Set (BSS) to improve Voice Internet Protocol (VoIP) transmission efficiency over a radio interface.

PRIOR ART

It is a problem in the art of BSS to increase the effective bandwidth of communications transmitted over the radio interface. Effective bandwidth is the actual amount of total bandwidth used for application data transferred over the radio interface per a unit of time. Effective bandwidth is a particular problem in providing Voice over Internet Protocol (VoIP) telephone communications over a BSS in a Wireless Local Area Network (WLAN).

Voice communications require a constant bit rate. In order to provide the constant bit rate, many small packets are constantly transmitted in order to provide the number of bits needed to provide quality voice communications. This significantly reduces the effective bandwidth of the network as each packet transmitted includes overhead bits used to identify the packet.

For example, a G.729 speech frame has a 20-byte (160 bit) payload requires the following number of bits to transmit the 160 bits, 144 bits of preamble, 48 bits of a PHYsical (PHY) layer header, 34*8 bits of Medium Access Control (MAC) header and Frame Check Sequence (FCS) header, 40*8 bits of IP/UDP/RTP header, and 20*8 bits of G.729 payload. Thus, the total number of bits transmitted is 944. Thus, bandwidth efficiency for voice packet=480 bits/944 bits transmitted or about 51% of the transmitted bits are used for voice communications.

One manner of improving the bandwidth efficiency of transmission is to aggregate packets in the MAC to reduce overhead spent on the MAC and PHY headers added by each frame. For example, 802.11n provides for aggregation of multiple MAC Protocol Data Units (MPDUs) and MAC Service Data Units (MSDUs). Studies have shown that this aggregation can provide about a 100% increase in the number of VoIP call that may be handled.

One problem with the 802.11n aggregation algorithms is that aggregation of the MSDUs can only aggregate MSDUs to the same address and aggregation of MPDUs may only aggregate MPDUs transmitted to different addresses. The latter is a general aggregation scheme which does not fit the needs of a VoIP application where every frame is small but the amount of frames is great in total. Thus, those skilled in the art are constantly striving for methods to further aggregates frames in the MAC layer to reduce the overhead of transmissions to increase the effective bandwidth of transmissions. This is especially important in networks that provide VoIP.

BRIEF DESCRIPTION OF THE DRAWINGS

The above and other aspects and advantages of this invention are described in the following Detailed Description and the following drawings.

DETAILED DESCRIPTION

Figure 1:
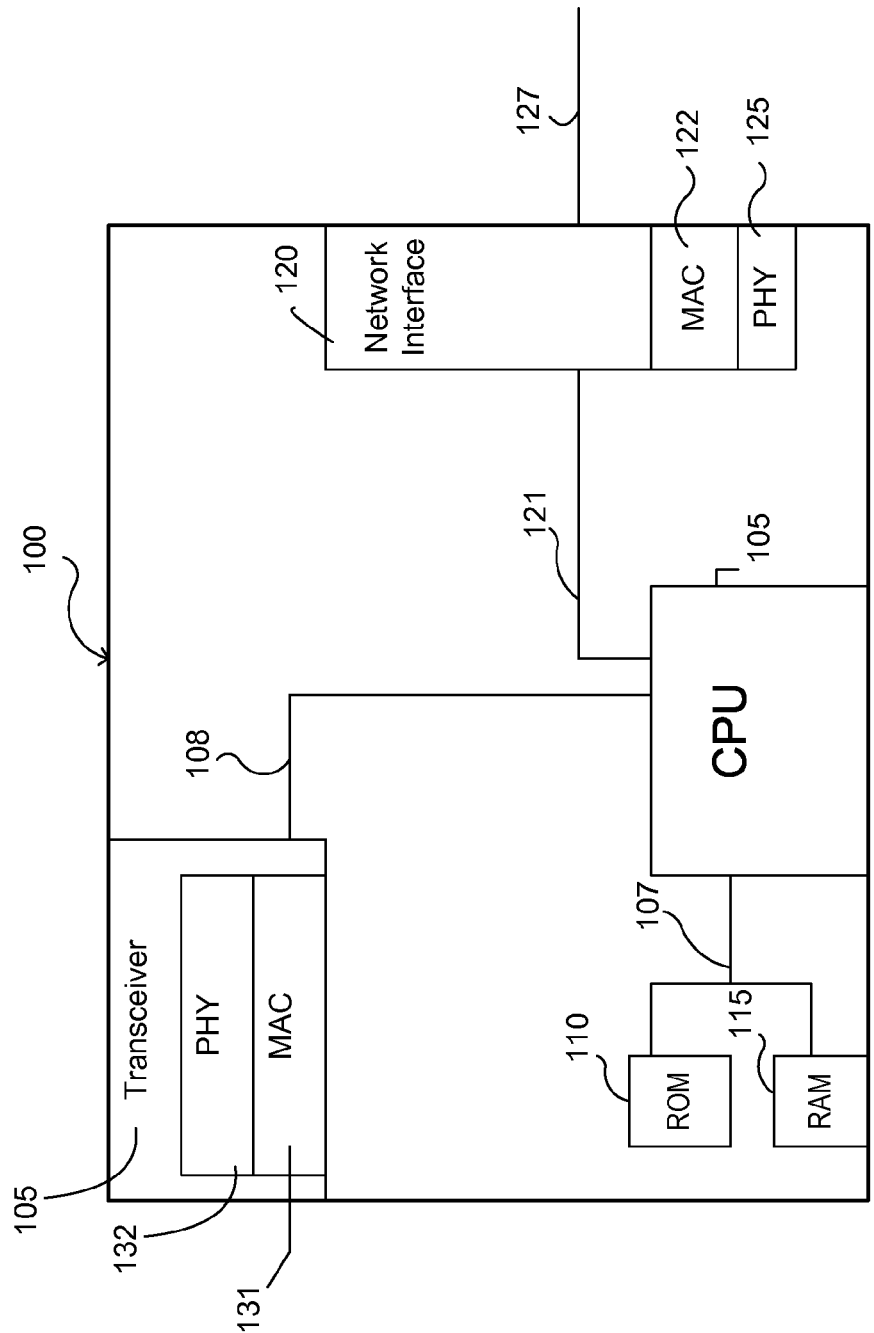
FIG. 1 illustrating an Access Point (AP) in accordance with this invention.

This invention relates to an AP that aggregates packets in a MAC layer to increase effective bandwidth. This invention is described below in a manner that allows one skilled in the art to design and use a system in accordance with this invention. When possible, like reference numerals have been used in the accompanying figures to describe the same or like elements of this invention.

FIG. 1 illustrates hardware components in a AP 100 in accordance with this invention. One skilled in the art will recognize that FIG. 1 illustrates the components in AP 100 needed and the relationships between the components. Other components are omitted for brevity and the exact configuration is left to those skilled in the art.

AP 100 includes a Central Processing Unit (CPU) 105. CPU 105 is a processor, microprocessor, or combination of processors and/or microprocessor that execute instructions stored in a memory to perform applications required to perform the services of an AP. CPU 100 is connected to Read Only Memory (ROM) 110 and Random Access Memory (RAM) 115 via memory bus 107. ROM 110 is any type of nonvolatile memory that stores configuration information and/or application instructions for AP 100. RAM 115 is a volatile memory that stores data and instructions for applications performed by AP 100. CPU 105 connects to an IP network through interface 120 via path 121.

Network interface 120 allows router 100 to receive data from and transmit data to the IP network via path 127. A Medium Access Control (MAC) layer 122 of interface 120 is a data link layer for communications that arranges the data in a known configuration for transmission across the network. MAC layer 122 passes the data to PHYsical (PHY) layer 125. PHY layer 125 is the circuitry that is configured to provide the data to transmit over the network to the physical components connecting AP 100 to the network.

CPU connects to transceiver 105 via bus 108. Transceiver 105 connects to an antenna to transmit data to and receive data from mobile processing devices in a given sector. Transceiver 105 includes a (MAC) layer 131 that is a data link layer for communications that arranges the data in a known configuration for transmission across the radio interface. MAC layer 131 passes the data to PHY layer 132. PHY layer 132 is the circuitry that is configured to provide the data to transmit over the radio interface to mobile processing device in BSS.

In accordance with this invention, an AP aggregates individual packets to increase the effective bandwidth of transmissions over the radio interface. In a preferred embodiment, MSDUs defined in the various IEEE 802.11 standards or drafts are aggregated to increase effective bandwidth to increase the number of VoIP calls that may be handled by the AP system. The aggregation is performed in the MAC layer of the AP to increase the efficiency of transmissions by reducing the overhead of bits added by the 802.11 MAC and PHY layers of the AP system. Thus, the following exemplary embodiment is shown in terms of frames defined in the 802.11 drafts or standards.

Figure 2:
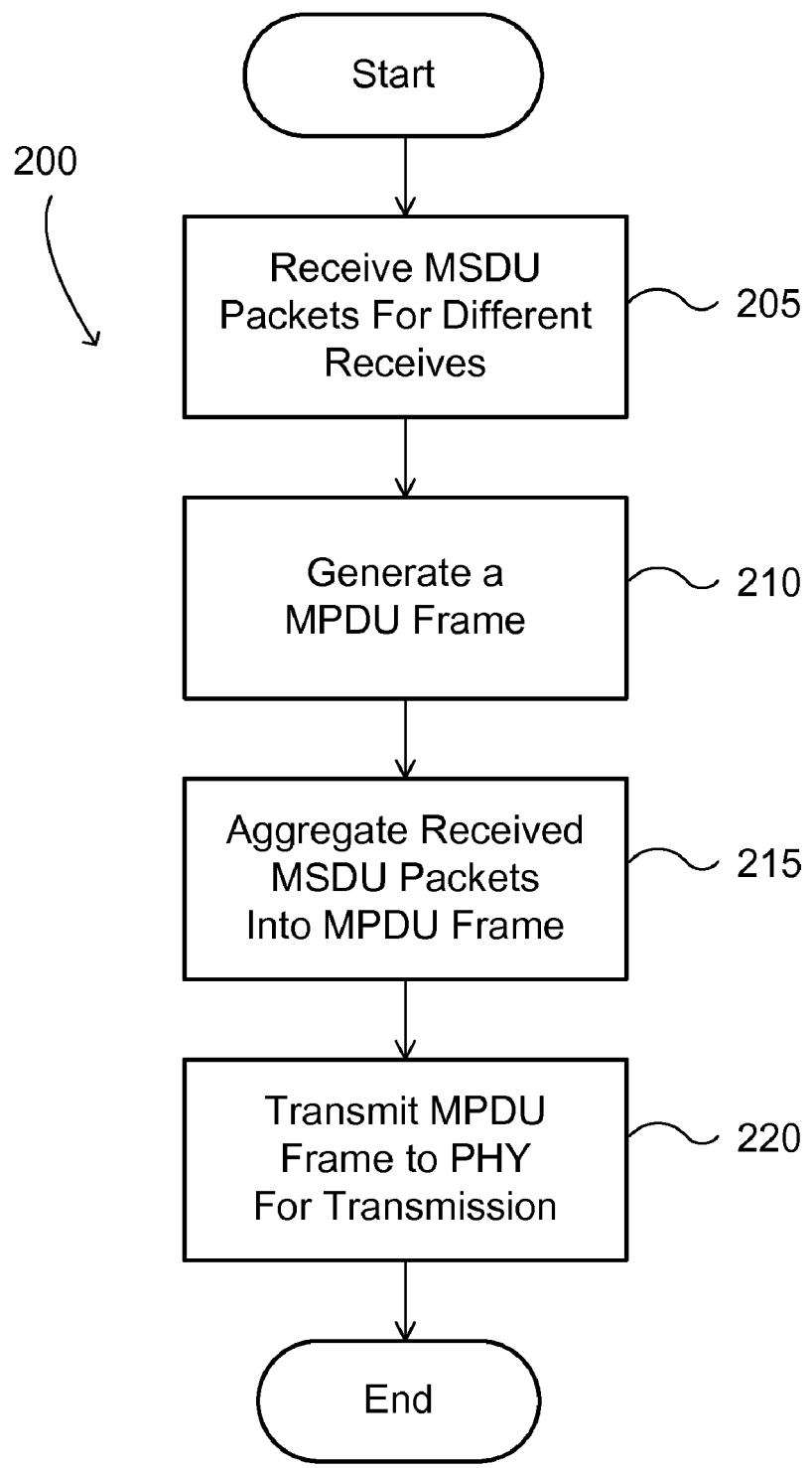
FIG. 2 illustrating a flow diagram of a method for aggregating packets in a MAC of the AP in accordance with this invention.

FIG. 2 illustrates a process performed in a 802.11 MAC layer of a AP system 100 to aggregate MAC Service Data Unit (MSDU) packets into MAC Protocol Data Unit (MPDU) frames that are passed to the PHY for transmission in PHY Protocol Data Unit (PPDU) frames over the air.

Process 200 begins in step 205 with the AP receiving multiple MSDU packets to transmit from its upstream connected network device in a specified time frame. Typically, there are certain timing demands for pushing these MSDUs towards transmission over the air. Thus, the MSDUs aggregated may depend on a time frame in which the MSDUs are received. In step 210, a MPDU is for transmitting the received MSDUs is generated. In a preferred exemplary embodiment, a Quality of Service (QoS) MPDU is generated as discussed below.

In step 215, the received MSDUs are aggregated and inserted into the generated MPDU. The completed MPDU is then transmitted from the MAC to the PHY in step 220 for transmission over the radio interface.

Figure 3:
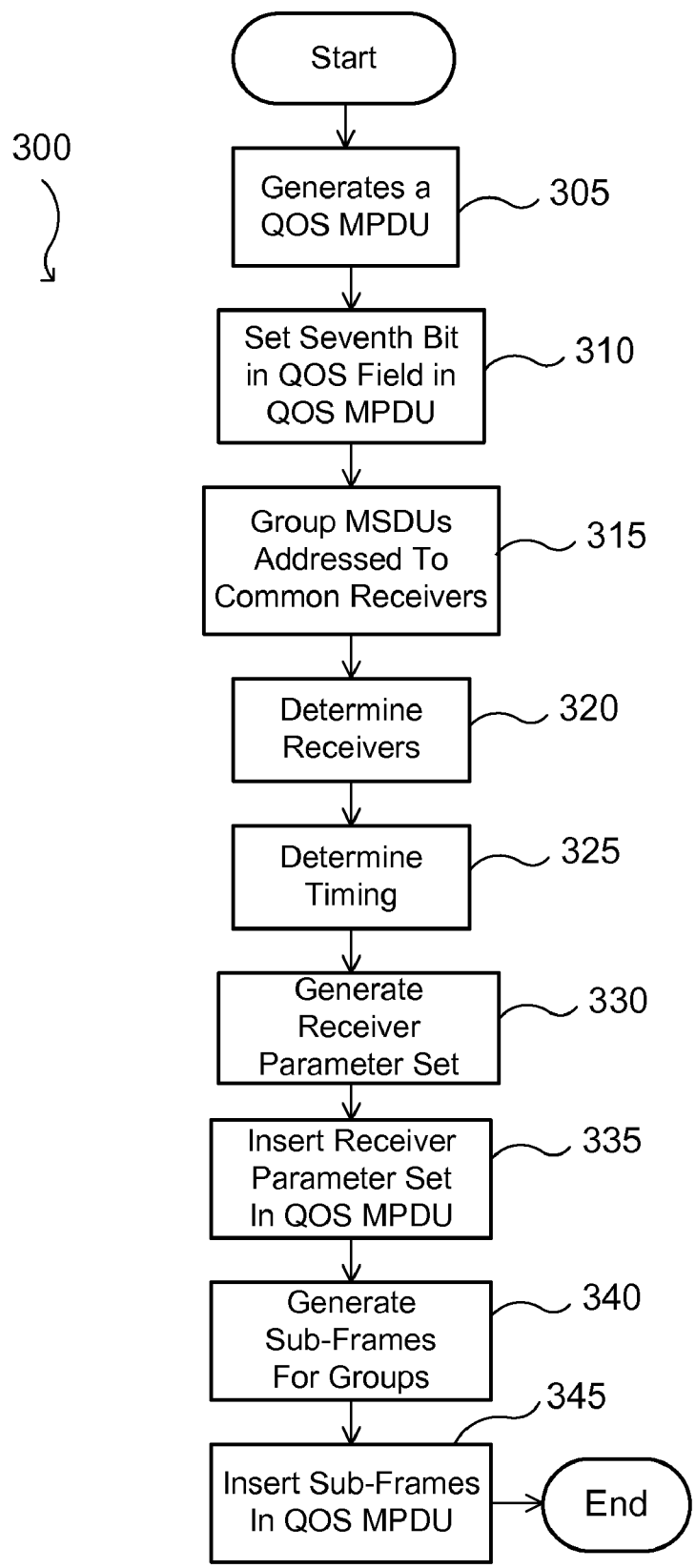
FIG. 3 illustrating a method for inserting the aggregated packets in a frame in a MAC of the AP in accordance with this invention.

FIG. 3 illustrates a process 300 for performing steps 210 and 215 in accordance with a preferred exemplary embodiment in accordance with this invention. Process 300 begins by generating a QoS MPDU in step 305. In step 310, an indication that the generated QoS MPDU includes multiple MSDUs is inserted into the QoS MPDU. In a preferred exemplary embodiment, the seventh bit in a QoS field is set to indicate that the MPDU includes multiple MSDUs.

In step 315, the received MSDUs addressed to a particular receiver are grouped together. The receivers for each group of MSDUs is then determined in step 320. The timing of the grouped MSDUs in a frame is determined in step 325. A parameter set is then generated in step 330. The parameter set includes a number of a receiver field indicating the number of receivers that have grouped MSDUs in the MPDU. In the preferred exemplary embodiment, the number of receivers field is one byte in length. The parameter set also includes a receiver information field for each receiver that has one or more MSDUs in the QoS MPDU. The receiver information field includes the address of the receiver, timing information for the MSDUs of the receiver in MPDU, transmission timing of responses including acknowledgements, and an acknowledgement policy field. In a preferred embodiment, each receiver information field is 8 bytes in length. Furthermore, in the preferred embodiment, the acknowledgment policy field in each receiver field is 2 bits and may indicate no acknowledgement, immediate acknowledgement, delayed acknowledgement and reserved. In the preferred exemplary embodiment, the receiver parameter set is inserted into the QoS MPDU after the QoS field.

In some embodiments, the grouped MSDUs are then inserted into QoS MPDU in step 345. However, in the preferred exemplary embodiment, process 300 continues by generating sub-frames for each group of MSDUs in step 340. Each sub-frame includes a sub-frame header which includes a source address, a destination address and a length of sub-frame field. One MSDU field then encloses the MSDUs in the sub-frame. Padding is then added to the sub frame. This eliminates the need for a header for each MSDU which in turn reduces the overhead in the MSDUs.

In step 345, the sub-frames are then inserted into the QoS MPDU in accordance with the timing determined in step 320. Process 300 then ends.

Figure 4:
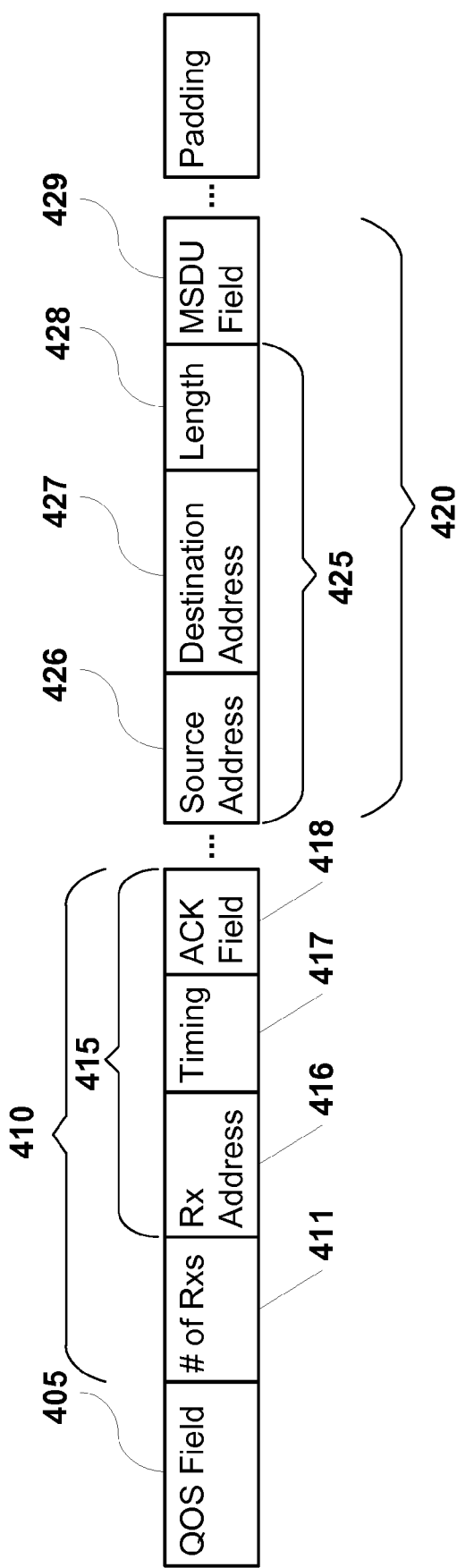
FIG. 4 illustrating a block diagram of a field in a frame of multiple packets in accordance with a preferred exemplary embodiment of this invention.

FIG. 4, illustrates a block diagram of the fields of a QoS MPDU frame in accordance with a preferred exemplary embodiment of this invention. QoS MPDU includes a QoS field 405 in accordance with a standard QoS MPDU frame as defined in 802.11 standards or draft (i.e. 11e, 11TGn). A receiver parameter set field 410 is then inserted between the QoS field and the payload. A receiver information field 415 for each receiver is included in the receiver parameter set field 410. Each receiver parameter set field includes a receiver address field 416, a timing field 417, and an acknowledgement policy field 418. After the receiver parameter set field 410, a sub-frame 420 is included for each group of MSDUs being transmitted to a particular receiver. The sub-frame 420 includes a sub-frame header 425. The sub-frame header includes a source address 426, a destination address 427, a length field 428 which indicates the length of the sub-frame, and MSDU field 429 including the data for the MSDUs in the group. When the last sub-frame 420 ends the MPDU may include padding bits needed.

The above describes exemplary embodiments of a system for aggregating packets in accordance with this invention. It is envisioned that those skilled in the arts can and will design alternative systems that aggregate packets that infringe on this invention as set forth in the following claims either literally or through the Doctrine of Equivalents.

What is claimed is:

1. A method for transmitting packets from an access point comprising:

receiving a plurality of Medium Access Control Service Data Unit packets (MSDUs) in a Medium Access Control unit of the access point, wherein each one of the MSDUs is addressed to at least one of a plurality of receivers in a Basic Service Set of the access point;

aggregating the MSDUs into a single Medium Access Control Protocol Data Unit packet (MPDU), wherein aggregating the MSDUs includes:

forming a plurality of groups of the MSDUs, wherein each one of the groups of the MSDUs includes all of the MSDUs addressed to a corresponding one of the receivers;

including each one of the groups of the MSDUs in corresponding ones of a plurality of subframes, each one of the subframes including a single corresponding subframe header instead of including a respective subframe header for each one of the MSDUs; and including the subframes in the single MPDU, a first one of the MSDUs in a first one of the subframes being addressed to a first one of the receivers, a second one of the MSDUs in a second one of the subframes being addressed to a second one of the receivers, the single MPDU including a single MPDU header instead of a respective MPDU header for each one of the subframes; and transmitting the single MPDU to a Physical layer of the access point for transmission.

2. The method of claim 1 wherein said Medium Access Control unit is an 802.11 Medium Access control unit.

3. The method of claim 1 wherein said Physical layer is an 802.11 Physical layer.

4. The method of claim 1 wherein the single MPDU includes a Quality of Service Medium Access Control Protocol Data Unit (QoSMPDU) packet.

5. The method of claim 4 further comprising:

setting a bit in the QoSMPDU packet to indicate the QoSMPDU packet includes the MSDUs aggregated in the single MPDU.

6. The method of claim 5, wherein aggregating the MSDUs further comprises inserting a receiver parameter set between a Quality of Service field and a frame body of the Quality of Service MPDU.

7. The method of claim 1 wherein aggregating the MSDUs further comprises including a receiver parameter set in the single MPDU and including in the receiver parameter set a number of receiver fields, wherein the number of receiver fields indicates a number of the receivers.

8. The method of claim 1 wherein aggregating the MSDUs further comprises including a receiver parameter set in the single MPDU and including in the receiver parameter set a receiver information field for each one of the receivers.

9. The method of claim 8 wherein the receiver information field indicates timing information of the MSDUs to a receiver, the receiver included in the receivers.

10. The method of claim 8 wherein the receiver information field indicates to each one of the receivers transmission timing information related to a transmission of a response to the MSDUs.

11. The method of claim 8 wherein aggregating the MSDUs further comprises including in the receiver information field an acknowledgement policy field, the acknowledgement policy field indicating whether an immediate acknowledgement is required for each corresponding one of the groups of the MSDUs in the single MPDU instead of indicating whether the immediate acknowledgement is required for the single MPDU as a whole.

12. The method of claim 1 further comprising including in the single corresponding subframe header for each one of the subframes only a destination address, a source address and a length of subframe.

13. The method of claim 12 further comprising:
including in the single MPDU only the single MPDU header, a single receiver parameter set, the subframes, and padding;
including in the single receiver parameter set only a number of receivers field indicative of the number of the receivers to receive the single MPDU and a receiver information field for each respective one of the receivers to receive the single MPDU; and
including in the receiver information field for each respective one of the receivers only an address of a respective one of the receivers, timing information related to the MSDU packets addressed to the respective one of the receivers, and an acknowledgement policy field indicating whether acknowledgements are required for the MSDU packets directed to the respective one of the receivers.

14. The method of claim 1 further comprising ensuring transmission of a Physical layer Protocol Data Unit including the MPDU and transmission of responses from all required receivers of the MSDUs fit entirely in a current Transmission Opportunity time slot.

15. An apparatus for transmitting packets from an access point comprising:
a memory
a processor in communication with the memory, the memory including computer code executable with the processor, wherein the computer code is configured to:
receive a plurality of Medium Access Control Service Data Unit packets in a Medium Access Control unit of the access point, wherein each one of the Medium Access Control Service Data Unit packets is addressed to at least one of a plurality of receivers in a Basic Service Set of the access point;
aggregate the plurality of Medium Access Control Service Data Unit packets into a single Medium Access Control Protocol Data Unit packet, wherein the computer code configured to aggregate the Medium Access Control Service Data Unit packets is further configured to:
form a plurality of groups of the Medium Access Control Service Data Unit packets, wherein each one of the groups of the Medium Access Control Service Data Unit packets includes all of the Medium Access Control Service Data Unit packets addressed to a corresponding one of the receivers;
include each one of the groups of the Medium Access Control Service Data Unit packets in corresponding ones of a plurality of subframes, wherein each one of the subframes includes a single corresponding subframe header without including a respective subframe header for each one of the Medium Access Control Service Data Unit packets in the single Medium Access Control Protocol Data Unit packet; and
include the subframes in the single Medium Access Control Protocol Data Unit packet, a first one of the Medium Access Control Service Data Unit packets in a first one of the subframes being addressed to a first one of the receivers, a second one of the Medium Access Control Service Data Unit packets in a second one of the subframes being addressed to a second one of the receivers, the single Medium Access Control Protocol Data Unit packet including a single Medium Access Control Protocol Data Unit header instead of a respective Medium Access Control Protocol Data Unit header for each one of the subframes; and
transmit the single Medium Access Control Protocol Data Unit packet to a Physical layer of the access point for transmission.

16. A tangible computer readable medium embodying one or more computer executable instructions for transmitting packets from an access point, the one or more computer executable instructions including instructions which are executable with a processor, the one or more computer executable instructions comprising: instructions executable to receive a plurality of Medium Access Control Service Data Unit (MSDU) packets in a Medium Access Control unit of the access point, wherein each one of the MSDU packets is addressed to at least one of a plurality of receivers in a Basic Service Set of the access point; instructions executable to aggregate the MSDU packets into a single Medium Access Control Protocol Data Unit (MPDU) packet, wherein the instructions executable to aggregate the MSDU packets into the single MPDU packet comprise: instructions executable to form a plurality of groups of the MSDU packets, wherein each one of the groups of the MSDU packets includes all of the MSDU packets addressed to a corresponding one of the receivers; instructions executable to include each one of the groups of the MSDU packets in corresponding ones of a plurality of subframes, wherein each one of the subframes includes a single corresponding subframe header instead of including a respective subframe header for each one of the MSDU packets; and instructions executable to include the subframes in the single MPDU packet, a first one of the MSDU packets in a first one of the subframes addressed to a first one of the receivers, a second one of the MSDU packets in a second one of the subframes addressed to a second one of the receivers, the single MPDU packet including a single MPDU header instead of a respective MPDU header for each one of the subframes; and instructions executable to transmit the single MPDU packet to a Physical layer of the access point for transmission.

17. A system for transmitting packets from an access point comprising:
- circuitry configured to receive a plurality of Medium Access Control Protocol Data Unit (MSDU) packets in a Medium Access Control unit of the access point, wherein each one of the plurality of MSDU packets is addressed to at least one of a plurality of receivers in a Basic Service Set of the access point, each one of the receivers is identified by a Medium Access Control address;
- circuitry configured to aggregate the plurality of MSDU packets into a single Medium Access Control Protocol Data Unit (MPDU) packet, wherein the circuitry configured to aggregate the MSDU packets into the single MPDU packet is further configured to:
  - form a plurality of groups of the MSDU packets, wherein each one of the groups of the MSDU packets includes all of the MSDU packets addressed to a corresponding one of the receivers;
  - include each one of the groups of the MSDU packets in corresponding ones of a plurality of subframes, wherein each one of the subframes includes a single corresponding subframe header instead of the subframes including a respective subframe header for each one of the MSDU packets; and
  - include the subframes in the single MPDU packet, a first one of the MSDU packets in a first one of the subframes being addressed to a first one of the receivers, a second one of the MSDU packets in a second one of the subframes being addressed to a second one of the receivers, the single MPDU packet including a single MPDU header instead of a respective MPDU header for each one of the subframes; and
- circuitry configured to transmit the single MPDU packet to a Physical layer of the access point for transmission to the receivers.

18. The system of claim 17 wherein said Medium Access Control unit is an 802.11 Medium Access control unit.

19. The system of claim 17 wherein said Physical layer is an 802.11 Physical layer.

20. The system of claim 17 wherein the single MPDU packet includes a Quality of Service Medium Access Control Protocol Data Unit packet.

21. The system of claim 20 further comprising circuitry configured to set a bit in a Quality of Service field of the Quality of Service Medium Access Control Protocol Data Unit packet to indicate the Quality of Service Medium Access Control Protocol Data Unit packet includes the plurality of MSDU packets.

22. The system of claim 21 further comprising:
- circuitry configured to insert a receiver parameter set between said Quality of Service field and a frame body of said Quality of Service Medium Access Control Protocol Data Unit packet.

23. The system of claim 22 wherein the receiver parameter set includes a number of receivers field and the number of receivers field indicates the number of the receivers to receive the plurality of MSDU packets.

24. The system of claim 22 wherein the receiver parameter set includes a receiver information field for each one of the receivers to receive the plurality of MSDU packets.

25. The system of claim 24 wherein the receiver information field advises a receiver of timing information related to the MSDU packets.

26. The system of claim 24 wherein the receiver information field advises a receiver of timing information for a response to the MSDU packets.

27. The system of claim 24 wherein the receiver information field includes an acknowledgement policy field to indicate whether acknowledgements are required for a group of the MSDU packets addressed to one of the receivers.

28. The system of claim 17 wherein the single corresponding subframe header for each of one of subframes only includes a destination address, a source address and a length of frame.

29. The system of claim 28 further comprising circuitry configured to only include in the single MPDU packet the single MPDU header, a single receiver parameter set, the subframes, and padding, the single receiver parameter set only including:
- a number of receivers field indicative of the number of the receivers to receive the single MPDU packet; and
- a receiver information field for each one of the receivers to receive the single MPDU packet, wherein the receiver information field for each one of the receivers only includes an address of a respective one of the receivers, timing information related to the MSDU packets addressed to the respective one of the receivers, and an acknowledgement policy field indicative of whether acknowledgements are required for the MSDU packets addressed to the respective one of the receivers.

30. The system of claim 17 further comprising circuitry configured to ensure transmission of a Physical layer Protocol Data Unit packet including the MPDU packet and transmission of responses from all required receivers of the plurality of MSDU packets fit entirely in a current Transmission Opportunity time slot.

* * * * *